(12) United States Patent
Naruse et al.

(10) Patent No.: US 7,951,324 B2
(45) Date of Patent: May 31, 2011

(54) METHOD FOR MANUFACTURING HONEYCOMB STRUCTURE

(75) Inventors: Kazuya Naruse, Courtenay (FR); Daniel Merle, Courtenay (FR); Koji Shimato, Dunavarsany (HU); Kazutomo Matsui, Ibi-gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 251 days.

(21) Appl. No.: 11/849,861

(22) Filed: Sep. 4, 2007

(65) Prior Publication Data

US 2008/0084010 A1   Apr. 10, 2008

(30) Foreign Application Priority Data

Sep. 14, 2006   (EP) .................................. 06291445

(51) Int. Cl.
C04B 35/64   (2006.01)

(52) U.S. Cl. ...................................... 264/630; 264/682

(58) Field of Classification Search .................. 264/630, 264/631, 682
See application file for complete search history.

(56) References Cited

U.S. PATENT DOCUMENTS

| | | | |
|---|---|---|---|
| 3,966,855 A * | 6/1976 | Hollenberg et al. | 264/120 |
| 4,004,934 A | 1/1977 | Prochazka | |
| 5,521,129 A | 5/1996 | Campos-Loriz et al. | |
| 5,914,187 A | 6/1999 | Naruse et al. | |
| 6,582,796 B1 * | 6/2003 | Joulin et al. | 428/116 |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2004/0161596 A1 | 8/2004 | Taoka et al. | |
| 2005/0109023 A1 | 5/2005 | Kudo et al. | |
| 2005/0153099 A1 | 7/2005 | Yamada | |
| 2005/0161849 A1 * | 7/2005 | Ohno et al. | 264/43 |
| 2005/0169819 A1 | 8/2005 | Shibata | |

(Continued)

FOREIGN PATENT DOCUMENTS

DE   294 701   10/1991

(Continued)

*Primary Examiner* — Matthew J Daniels
*Assistant Examiner* — Erin Snelting
(74) *Attorney, Agent, or Firm* — Ditthavong Mori & Steiner, P.C.

(57) ABSTRACT

The method for manufacturing a honeycomb structure includes preparing a material composition containing at least a silicon carbide powder, a binder and an additive; molding the material composition to form a pillar-shaped honeycomb molded body in which a number of cells are placed in parallel with one another in a longitudinal direction with a cell wall therebetween; carrying out a degreasing treatment on the honeycomb molded body; and carrying out a firing treatment on the honeycomb degreased body to manufacture a honeycomb fired body. The additive contains at least one kind selected from the group consisting of alumina, silica, titania, zirconia, magnesia, and a chemical composite containing any of alumina, silica, titania, zirconia and magnesia.

9 Claims, 4 Drawing Sheets

U.S. PATENT DOCUMENTS

| | | |
|---|---|---|
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029897 A1 | 2/2006 | Saijo et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0157445 A1 | 7/2008 | Kawai et al. |
| 2008/0174039 A1 | 7/2008 | Saijo et al. |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1 555 254 | 7/2005 |
| EP | 1787968 A1 * | 5/2007 |
| JP | 2002-265270 | 9/2002 |
| WO | WO 2006035645 A1 * | 4/2006 |

* cited by examiner

A-A line cross-sectional view

METHOD FOR MANUFACTURING HONEYCOMB STRUCTURE

CROSS-REFERENCE TO RELATED APPLICATIONS

The present application claims priority under 35 U.S.C. §119 to EP 06291445.2 filed on Sep. 14, 2006. The contents of this application are incorporated herein by reference in their entirety.

BACKGROUND OF THE INVENTION

1. Field of the Invention

The present invention relates to a method for manufacturing a honeycomb structure and a material composition for a honeycomb fired body.

2. Discussion of the Background

Recently, particulates, such as soot, contained in exhaust gases that are discharged from internal combustion engines of vehicles, such as buses and trucks, and construction machines and the like have raised serious problems as contaminants harmful to the environment and the human body. There have been proposed various honeycomb filters using a honeycomb structure made from porous ceramics, which serve as filters capable of capturing particulates in exhaust gases to purify the exhaust gases.

Conventionally, in order to manufacture a honeycomb structure made from silicon carbide as those mentioned above, first, for example, silicon carbide powder, a binder, a dispersant solution and the like are mixed to prepare a material composition. This material composition is then continuously extrusion-molded, and the extruded molded body is cut into a predetermined length to manufacture a rectangular pillar-shaped honeycomb molded body.

Next, the honeycomb molded body obtained above is dried by using a microwave drying apparatus or a hot-air drying apparatus, and the predetermined cells thereof are sealed so that either one of the end portions of each of cells is sealed, and then a degreasing treatment and a firing treatment are carried out on this to manufacture a honeycomb fired body.

Thereafter, a sealing material paste is applied to side faces of the honeycomb fired bodies to bond the honeycomb fired body to one another so that an aggregated body of the honeycomb fired bodies in which a number of honeycomb fired bodies are combined by interposing the sealing material layer (adhesive layers). Next, a cutting process is carried out on the resulting aggregated body of the honeycomb fired body, that is formed into a predetermined shape such as a cylindrical shape, a cylindroid shape and the like by using a cutting machine and the like to form a honeycomb block, and lastly, a sealing material paste is applied to the periphery of the honeycomb block to form a sealing material layer (coat layer), thereby completing the manufacturing of a honeycomb structure.

In the case where a honeycomb structure is manufactured by the above-mentioned process, usually, manufacture of the honeycomb structure has been carried out using a commercially available silicon carbide powder. However, in the conventional method for manufacturing a honeycomb structure, there have been cases where, upon using a commercially available silicon carbide powder, sintering of silicon carbide does not proceed well in the firing process, and thus occasionally there may be difficulty in manufacturing a honeycomb structure with sufficient strength.

As a method for manufacturing a honeycomb structure of this kind, Japanese Unexamined Patent Application Publication No. 2002-265270 discloses a manufacturing method using, as a silicon carbide powder, silicon carbide powder containing 0.1 to 5% by weight of silica. The contents of Japanese Unexamined Patent Application Publication No. 2002-265270 are incorporated herein by reference in their entirety.

SUMMARY OF THE INVENTION

The method for manufacturing a honeycomb structure of the present invention is a method for manufacturing a honeycomb structure such as a honeycomb fired body, including the steps of: preparing a material composition containing at least a silicon carbide powder, a binder and an additive; manufacturing a pillar-shaped honeycomb molded body in which a number of cells are placed in parallel with one another in a longitudinal direction with a cell wall therebetween by molding the material composition; manufacturing a honeycomb degreased body by carrying out a degreasing treatment on the honeycomb molded body; and manufacturing a honeycomb fired body by subjecting the honeycomb degreased body to a firing treatment, wherein the additive contains at least one kind selected from the group consisting of alumina, silica, titania, zirconia, magnesia, and a chemical composite containing any of alumina, silica, titania, zirconia and magnesia.

In the method for manufacturing a honeycomb structure of the present invention, the chemical composite containing any of alumina, silica, titania, zirconia and magnesia is desirably a silica-alumina composite, a silica-titania composite, a silica-zirconia composite, a zirconia-alumina-silica composite, a magnesia-alumina composite, or a magnesia-silica-alumina composite, and the compounding amount of the additive is desirably at least about 1% by weight and at most about 5% by weight of the total amount of the silicon carbide powder. Also, the additive is desirably a powder having an average particle diameter (D50) of at least about 0.05 µm and at most about 0.3 µm.

In the method for manufacturing a honeycomb structure of the present invention, desirably, the purity of the silicon carbide powder is at least about 96.0% by weight and at most about 99.5% by weight. In addition, in the method for manufacturing a honeycomb structure of the present invention, the additive desirably includes silica and/or a chemical composite containing silica. Moreover, in the method for manufacturing a honeycomb structure of the present invention, desirably, the additive includes silica and/or a chemical composite containing silica, and the content of silica in the material composition is set to at least about 2.5% by weight and at most about 6.5% by weight. In the method for manufacturing a honeycomb structure of the present invention, the additive is desirably silica, and the silica is more desirably an amorphous silica. Moreover, in the method for manufacturing a honeycomb structure of the present invention, the average particle diameter (D50) of the additive is desirably smaller than that of the silicon carbide.

Furthermore, in the method for manufacturing a honeycomb structure of the present invention, the silicon carbide powder desirably includes a silicon carbide fine powder having the average particle diameter (D50) of at least about 0.1 µm and at most about 1.0 µm; and a silicon carbide coarse powder having the average particle diameter (D50) larger than that of the silicon carbide fine powder, and desirably, the content of the silicon carbide fine powder with respect to the total amount of the silicon carbide powder is at least about 4.7% by weight and at most about 39.4% by weight, and the average particle diameter (D50) of the additive is desirably smaller than that of the silicon carbide fine powder.

In the method for manufacturing a honeycomb structure of the present invention, the honeycomb structure may be manufactured by bonding a plurality of the honeycomb fired bodies to one another by interposing adhesive layers, or may be manufactured by a single piece of the honeycomb fired body. Moreover, in the method for manufacturing a honeycomb structure of the present invention, either one of end portions of each cell of the honeycomb fired body is desirably sealed with a plug.

A material composition for a honeycomb fired body contains at least a silicon carbide powder, a binder and an additive, wherein the additive contains at least one kind selected from the group consisting of alumina, silica, titania, zirconia, magnesia, and a chemical composite containing any of alumina, silica, titania, zirconia and magnesia.

In the material composition for a honeycomb fired body of the present invention, the chemical composite containing any of alumina, silica, titania, zirconia and magnesia is desirably a silica-alumina composite, a silica-titania composite, a silica-zirconia composite, a zirconia-alumina-silica composite, a magnesia-alumina composite, or a magnesia-silica-alumina composite, and the compounding amount of the additive is desirably at least about 1% and at most about 5% by weight of the total amount of the silicon carbide powder. Also, the additive is desirably a powder having an average particle diameter (D50) of at least about 0.05 μm and at most about 0.3 μm.

In the material composition for a honeycomb fired body of the present invention, desirably, the purity of the silicon carbide powder is at least about 96.0% by weight and at most about 99.5% by weight. In addition, in the material composition for a honeycomb fired body of the present invention, the additive desirably includes silica and/or a chemical composite containing silica. Moreover, in the material composition for a honeycomb fired body of the present invention, the additive desirably includes silica and/or a chemical composite containing silica, and the content of silica in the material composition is desirably set to at least about 2.5% by weight and at most about 6.5% by weight.

In the material composition for a honeycomb fired body of the present invention, the additive is desirably silica, and the silica is more desirably an amorphous silica. Moreover, in the material composition for a honeycomb fired body of the present invention, the average particle diameter (D50) of the additive is desirably smaller than that of the silicon carbide.

Furthermore, in the material composition for a honeycomb fired body of the present invention, the silicon carbide powder desirably includes a silicon carbide fine powder having the average particle diameter (D50) of at least about 0.1 μm and at most about 1.0 μm; and a silicon carbide coarse powder having the average particle diameter (D50) larger than that of the silicon carbide fine powder, and desirably, the content of the silicon carbide fine powder with respect to the total amount of the silicon carbide powder is desirably at least about 4.7% by weight and at most about 39.4% by weight, and the average particle diameter (D50) of the additive is desirably smaller than that of the silicon carbide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings. The method for manufacturing a honeycomb structure according to the embodiments of the present invention is a method for manufacturing a honeycomb structure such as a honeycomb fired body, including the steps of: preparing a material composition containing at least a silicon carbide powder, a binder and an additive; manufacturing a pillar-shaped honeycomb molded body in which a number of cells are placed in parallel with one another in a longitudinal direction with a cell wall therebetween by molding the material composition; manufacturing a honeycomb degreased body by carrying out a degreasing treatment on the honeycomb molded body; and manufacturing a honeycomb fired body by carrying out a firing treatment on the honeycomb degreased body, wherein the additive contains at least one kind selected from the group consisting of alumina, silica, titania, zirconia, magnesia, and a chemical composite containing any of alumina, silica, titania, zirconia and magnesia. In the present specification, the shape indicated by the word "pillar" refers to any desired shape of a pillar including a round or polygonal pillar.

According to the embodiments of the method for manufacturing a honeycomb structure of the present invention, since a material composition containing at least one kind selected from the group consisting of alumina, silica, titania, zirconia, magnesia and a chemical composite containing any of alumina, silica, titania, zirconia and magnesia, is used as an additive, it may become easier for sintering of the silicon carbide to proceed without fail, and thus it may become easier to manufacture a honeycomb structure having small dispersion in the pore diameter and high strength.

According to the material composition for a honeycomb fired body according to the embodiments of the present invention, since a material composition containing at least one kind selected from the group consisting of alumina, silica, titania, zirconia, magnesia and a chemical composite containing any of alumina, silica, titania, zirconia and magnesia, is used as an additive, sintering of the silicon carbide proceeds without fail, and thus it may become easier to manufacture a honeycomb fired body having small dispersion in the pore diameter and high strength, by using this material composition for a honeycomb fired body.

The following description will discuss the method for manufacturing a honeycomb structure according to the embodiments of the present invention in the order of the process. Firstly, the method for manufacturing a honeycomb structure according to the embodiments of the present invention is explained by taking, as an example, the case of manufacturing a honeycomb structure in which a plurality of honeycomb fired bodies 110 as shown in FIGS. 1, 2A and 2B are combined with one another by interposing a sealing material layer (adhesive layer) 101 to form a honeycomb block 103, and a sealing material layer (coat layer) 102 is further formed on the periphery of this honeycomb block 103.

Figure 1:
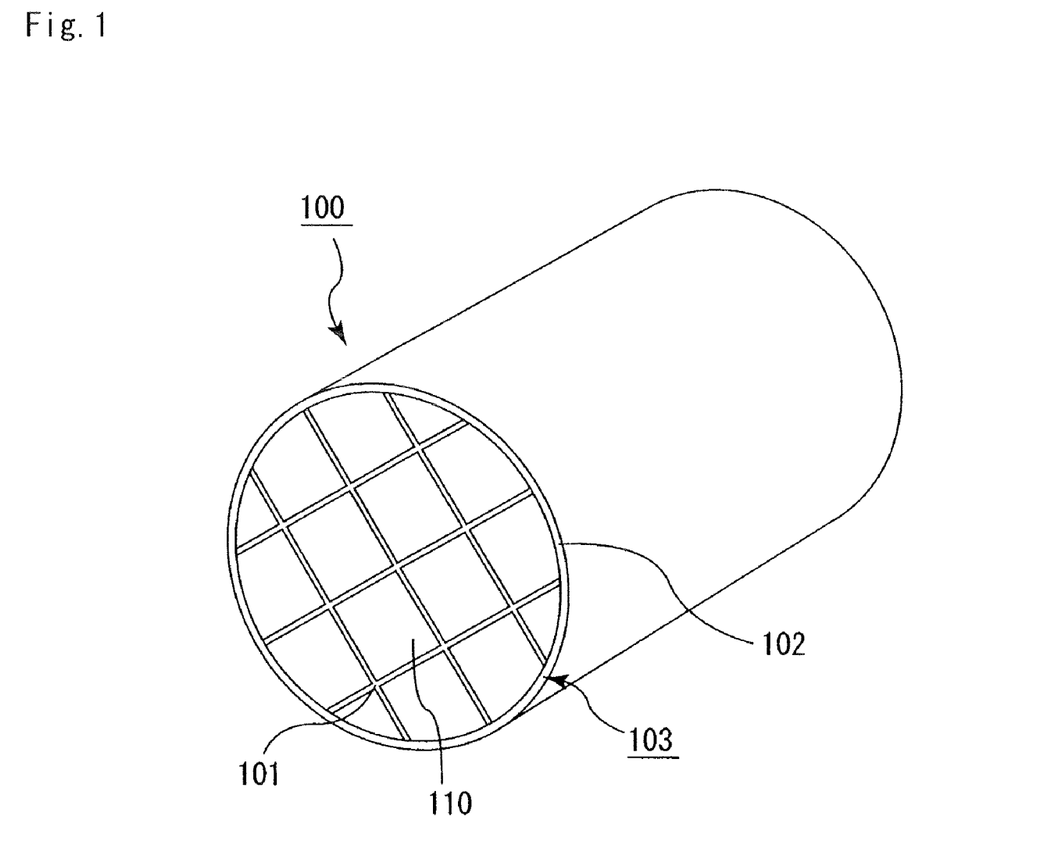
FIG. 1 is a perspective view that schematically shows one example of embodiment of a honeycomb structure.
Figure 2A:
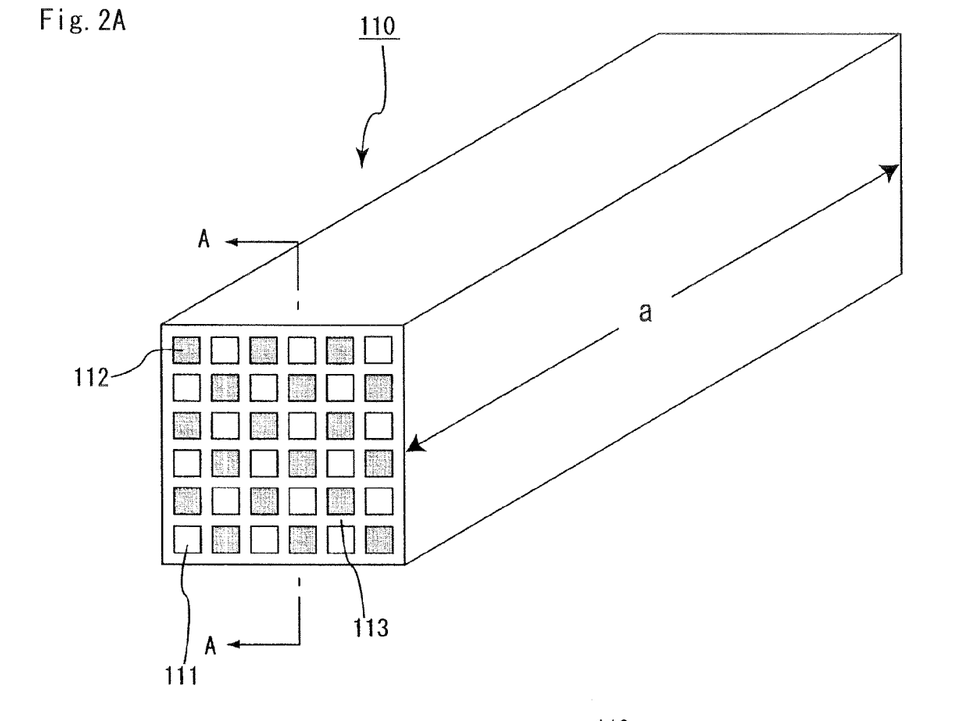
FIG. 2A is a perspective view that schematically shows a honeycomb fired body forming the honeycomb structure of the embodiment shown in FIG. 1.

FIG. 1 is a perspective view that schematically shows one example of the honeycomb structure of this type. FIG. 2A is a perspective view that schematically shows a honeycomb fired body constituting the honeycomb structure, and FIG. 2B is a cross-sectional view taken along line A-A of FIG. 2A.

In the honeycomb structure 100, as shown in FIG. 1, a plurality of honeycomb fired bodies 110 are bonded to one another by interposing a sealing material layer (adhesive layer) 101 to form a honeycomb block 103, and a sealing material layer (coat layer) 102 is further formed on the periphery of this honeycomb block 103. As shown in FIGS. 2A and 2B, the honeycomb fired body 110 has a structure in which a number of cells 111 are placed in parallel with one another in the longitudinal direction (the direction shown by arrow a in FIG. 2A), and a cell wall 113 separating the cells 111 is allowed to function as a filter.

Figure 2B:
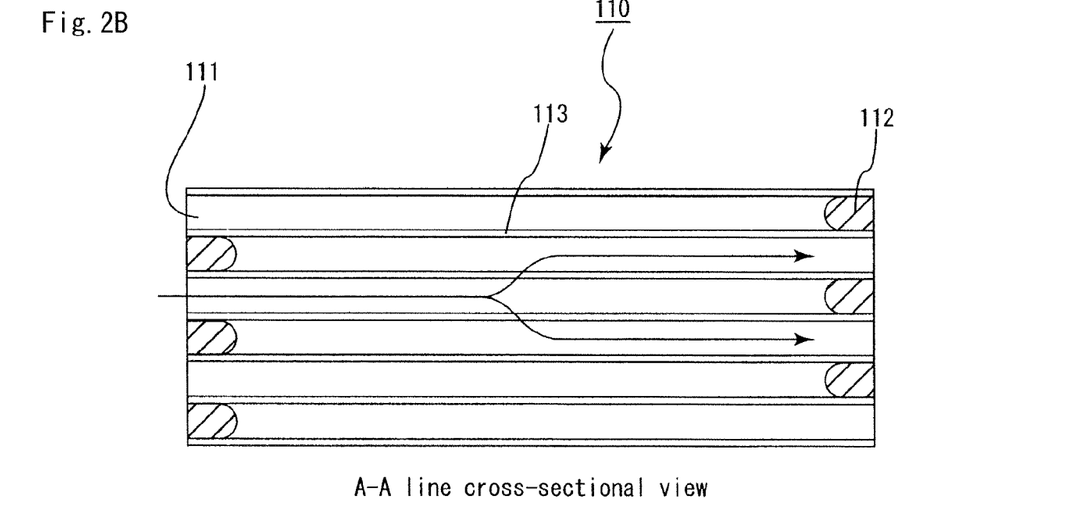
FIG. 2B is a cross-sectional view taken along line A-A of FIG. 2A.

In other words, as shown in FIG. 2B, each of the cells 111, formed in the honeycomb fired body 110, is sealed by a plug 112 at either one end of its exhaust gas-inlet or exhaust gas-outlet sides so that exhaust gases that flow into one of cells 111 are discharged from another cell 111 after surely passing through the cell wall 113 that separates the cells 111, and, when exhaust gases pass through the cell wall 113, particulates are captured by the cell wall 113 portion so that the exhaust gases are purified. Meanwhile, honeycomb structures manufactured by the manufacturing method according to the embodiments of the present invention are not limited to the honeycomb structure having a structure mentioned above.

In the above-mentioned method for manufacturing a honeycomb structure according to the embodiments, firstly, a material composition containing at least silicon carbide powder, a binder and an additive, and the additive contains at least one kind selected from the group consisting of alumina, silica, titania, zirconia, magnesia, and a chemical composite containing any of alumina, silica, titania, zirconia and magnesia, is prepared.

With respect to the additive, desirably, alumina, silica, titania, zirconia and magnesia respectively have a purity of about 95% by weight or more. As for the chemical composite containing any of alumina, silica, titania, zirconia and magnesia, examples thereof include a silica-alumina composite, a silica-titania composite, a silica-zirconia composite, a zirconia-alumina-silica composite, a magnesia-alumina composite, a magnesia-silica-alumina composite and the like.

In the above-mentioned method for manufacturing a honeycomb structure according to the embodiments, use of a material composition containing an additive as the above may improve the sintering characteristics of silicon carbide more easily. The reason for this is described below. In the method for manufacturing a honeycomb structure according to the embodiments of the present invention, as will be described later, a honeycomb molded body is manufactured by molding the material composition, and then a degreasing treatment is carried out on the honeycomb molded body to manufacture a honeycomb degreased body.

In the degreasing treatment, a binder, a dispersant solution and the like in the material composition are decomposed and removed. However, in this degreasing treatment, if the degreasing treatment is allowed to proceed completely and the organic components in the honeycomb molded body are completely decomposed and removed, the strength of the resulting degreased honeycomb molded body (honeycomb degreased body) tends to become low to retain its shape, and it may become difficult to retain its shape; which may in some cases cause pinholes, cracks or the like in the honeycomb fired body obtained through a firing treatment. Also, if the organic components in the honeycomb molded body are completely decomposed and removed in the degreasing treatment, the thermal conductivity of the honeycomb degreased body tends to be lowered and thus cracks may occur due to thermal shock in the firing treatment that follows the degreased treatment. Therefore, the degreasing treatment is desirably carried out under such conditions that carbon remains in the honeycomb degreased body to a certain degree.

On the other hand, in the firing treatment carried out after manufacturing the honeycomb degreased body, carbons existing in the honeycomb degreased body intervene between silicon carbide powders and inhibit the contact among the silicon carbide powders, and as a result, presumably inhibit sintering of silicon carbide.

In the method for manufacturing a honeycomb structure according to the embodiments of the present invention, at least one kind of oxide selected from the group consisting of alumina, silica, titania, zirconia, magnesia and these complex compounds is added to the material composition. In the case where the degreasing temperature is set to at least about 300° C. to at most about 500° C., these oxides tend not to have an oxidative effect, and therefore, it may become difficult to remove the residual carbon. On the other hand, in the case where the sintering temperature is set to about 2000° C. or more, these oxides tend to have an oxidative effect, and therefore, it may become easier to remove the residual carbon. Thus, it may become easier to proceed with degreasing with carbon coexisting, and pinholes, cracks or the like at the time of degreasing are more likely to be prevented. Moreover, at the time of sintering, since carbon which tends to become an inhibitor to sintering is removed, it may become easier to proceed with sintering and improve the degree of sintering of silicon carbide.

Here, when the above-mentioned additive is added to the material composition, carbons in the honeycomb degreased body may be removed more easily in the firing treatment, and thus, it may become easier to proceed with sintering of silicon carbide without fail. Specifically, for example, when the additive contains silica or a chemical composite containing silica, presumably, a reaction in the following reaction equation (1) proceeds to the right so that carbons in the honeycomb degreased body are removed.

$$SiO_2 + C \rightleftharpoons SiO\uparrow + CO\uparrow \qquad (1)$$

Also, when the additive contains alumina, titania, zirconia, magnesia, or a chemical composite containing any of these elements, it may be considered that each of the following reaction equations (2) to (5) proceeds to the right so that carbons in the honeycomb degreased body are removed.

$$Al_2O_3 + 2C \rightleftharpoons Al_2O + 2CO\uparrow \qquad (2)$$

$$TiO_2 + C \rightleftharpoons TiO + CO\uparrow \qquad (3)$$

$$ZrO_2 + C \leftrightarrows ZrO + CO\uparrow \quad (4)$$

$$MgO + C \leftrightarrows Mg + CO\uparrow \quad (5)$$

As stated above, when at least one kind selected from the group consisting of alumina, silica, titania, zirconia, magnesia, and a chemical composite containing any of alumina, silica, titania, zirconia and magnesium is included as an additive, carbons in the honeycomb degreased body may be removed more easily in the firing treatment, so that it may become easier for sintering of silicon carbide to proceed without fail, and as a result, a desired honeycomb fired body may be obtained more easily.

Here, in the manufacturing method disclosed in Japanese Unexamined Patent Application Publication No. 2002-265270, silicon carbide powder containing 0.1% by weight to 5% by weight of silica is used as the silicon carbide powder. Generally, in manufacturing the silicon carbide powder, petroleum coke and silica stone are burned in an electric furnace to generate an ingot of silicon carbide, and by pulverizing this ingot, silicon carbide powder having a predetermined particle diameter is manufactured. Here, the longer and slower it takes to carry out the step of pulverizing the ingot into a predetermined particle diameter, the more the amount of silica contained in the silicon carbide powder may be increased more easily. However, when the pulverizing step is carried out slowly by taking time in order to increase the amount of silica, the amount of impurities in the manufactured silicon carbide powder tends to increase. When silicon carbide powder with a high impurity content is used to manufacture a honeycomb structure, the problem of reduced strength of the manufactured honeycomb structure tends to arise due to the presence of the impurities. Here, the increased impurities presumably get mixed into the silicon carbide powder during the pulverizing step, due to abrasion of the pulverizer.

Moreover, it is a matter of course that commercially available silicon carbide powders do not always contain silica within the above range, and thus there is a limitation on the usable silicon carbide powders in the manufacturing method described in Japanese Unexamined Patent Application Publication No. 2002-265270.

As disclosed in Japanese Unexamined Patent Application Publication No. 2002-265270, when silicon carbide powder containing silica is selectively used, presumably, the reaction shown in the above reaction equation (1) also proceeds to the right in the firing step. However, as compared to those manufacturing methods in which specific silicon carbide powders are used, the method for manufacturing a honeycomb structure according to the embodiments of the present invention is advantageous in terms of the following points. As already described, in order to increase the amount of silica in the silicon carbide powder, the pulverizing process of an ingot of silicon carbide is necessarily carried out slowly by taking time, the amount of impurities contained in the silicon carbide powder tends to increase. Further, since those impurities usually remain in the honeycomb fired body after firing, the resulting honeycomb fired body (honeycomb structure) may have degradation in its strength and also have an insufficient chemical resistance in some cases. In contrast, when an additive such as silica is separately added to the material composition, as in the manufacturing method according to the embodiments of the present invention, those problems which derive from the existence of impurities, including reduced strength, lower chemical resistance and the like, may be avoided more easily. Here, examples of impurities in the silicon carbide powder, excepting silica, include carbon, Fe, Al, Co, Cr, Mn, Ni, Zr and the like.

Among the above-mentioned additives, silica and/or a chemical composite containing silica are desirably used, and silica is more desirably used. This is because, since silicon carbide is a Si compound, when silica which is a Si compound is selected as an additive, a superior chemical resistance may be obtained more easily as compared to the cases where alumina which is an Al compound, titania which is a Ti compound, zirconia which is a Zr compound or magnesia which is a Mg compound is selected. Moreover, when silica is used as an additive, due to the excellent chemical resistance as mentioned above, problems such as deterioration of durability, erosion or the like hardly occur in the honeycomb structure, even when the additive remains in the honeycomb structure.

The silica may be a crystalline silica or may be an amorphous silica, and an amorphous silica is more desirably used. This is because an amorphous silica has a lower melting point compared to that of crystalline silica. With respect to the silica, a fumed silica which is an amorphous silica is desirably used. This is because the fumed silica has a high specific surface area, which leads to a very high reactivity.

The compounding amount of the additive is desirably at least about 1% by weight and at most about 5% by weight of the total amount of the silicon carbide powder. This is because, when the compounding amount of the additive is about 1% by weight or more, the effect of removing carbons in the honeycomb degreased body during the firing process as mentioned above is more likely to be sufficiently obtained, thereby tending not to cause dispersion in the pore diameter and reduced strength of the manufactured honeycomb structure. On the other hand, when the compounding amount of the additive is 5% by weight or less, the amount of the additive contained in the honeycomb fired body after completion of the firing process tends not to become high, and as a result, deterioration of the chemical resistance and corrosion resistance of the honeycomb fired body tend not to occur. Moreover, when the compounding amount of the additive is about 5% by weight or less, the strength of the manufactured honeycomb structure tends not to be reduced. The reason for this is that since not too much progress of the sintering of silicon carbide is made, pore diameters do not become too large.

The additive is desirably a powder having an average particle diameter (D50) of at least about 0.05 μm and at most about 0.3 μm. When the average particle diameter (D50) is about 0.05 μm or more, sintering of the honeycomb degreased body does not proceed excessively so that the average pore diameter of the resulting honeycomb fired body does not become too large, and as a result, the strength of the honeycomb fired body tends not to become low. Furthermore, in many cases, the additive having an average particle diameter (D50) of less than about 0.05 μm is difficult to manufacture and not easily obtainable. On the other hand, when the average particle diameter (D50) is about 0.3 μm or less, the manufactured honeycomb structure tends not to have widely dispersed pore diameters, reduced strength or increased pressure loss. The reason for this is presumably because, due to the superior dispersibility in the material composition, reactions shown in the above reaction equations (1) to (5) for removing carbons remaining in the honeycomb degreased body do not proceed locally, and as a result, reactions to remove carbons in the honeycomb degreased body as a whole are more likely to proceed well. Here, in case where the additive contains silica or a chemical composite containing silica, it is desirable that the average pore diameter particularly falls within the above-mentioned range.

Moreover, the average particle diameter (D50) of the additive is desirably smaller than the average particle diameter (D50) of the silicon carbide powder, and in particular, when the silicon carbide powder includes silicon carbide fine powder and silicon carbide coarse powder as will be described later, the average particle diameter (D50) of the additive is desirably smaller than the average particle diameter (D50) of the silicon carbide fine powder.

By setting the average particle diameter (D50) of the additive to the above-mentioned size, it may become easier for the reaction between carbons and the additive to proceed without fail. This is presumably due to the following two reasons. The first reason is that, by setting the average particle diameter (D50) of the additive to a size smaller than the average particle diameter (D50) of the silicon carbide powder, the additive is allowed to disperse evenly around each of the silicon carbide particles, and consequently allowed to highly disperse in the whole honeycomb degreased body. The second reason can be explained as follows: the reaction between the additive and carbons proceeds more easily as the probability of contact between the additive and the carbons increases, and the probability of contact between the additive and the carbons increases as the exposed area of the additive, i.e. the surface area of the additive, becomes larger, and the total surface area of the additive becomes larger as the average particle diameter (D50) of the additive becomes smaller.

In the present specification, the average particle diameter (D50) refers to a median diameter based on volume and can be measured by a laser diffraction scattering method. Here, a specific measuring method of a particle diameter is briefly described. A particle size (particle diameter) is typically represented as an abundance ratio distribution per particle diameter by integrating the measuring results. This abundance ratio distribution per particle diameter is referred to as a particle size distribution. As a measuring method of the particle size distribution, for example, a laser diffraction scattering method on a principle of a measurement based on a volume, or the like, can be employed. Here, in such a method, the particle size distribution is measured on the assumption that the particles have a spherical shape. Then, the particle size distribution is converted into a cumulative distribution, and therefore the above-mentioned median diameter (the diameter where an amount of particles included in a group having larger particle diameters and an amount of particles included in a group having smaller particle diameters becomes equal when a group of particles is divided into the two groups by a certain particle diameter) is calculated.

In the case where the additive includes silica and/or a chemical composite containing silica, desirably, the content of silica in the material composition is at least about 2.5% by weight and at most about 6.5% by weight. When the content of silica is about 2.5% by weight or more, carbons in the honeycomb degreased body tend to be sufficiently removed in the firing process, and therefore the manufactured honeycomb structures tend not to have a reduced strength or too high a pressure loss. On the other hand, when the content of the silica is about 6.5% by weight or less, sintering of silicon carbide does not proceed excessively, the pore diameter does not become too large, and as a result, the strength tends not to be reduced. Also, use of silica and/or a chemical composite containing silica as the additive allows the manufactured honeycomb structure to have excellent chemical resistance, and thus problems such as deterioration of durability, erosion or the like are less likely to occur when the additive remains in the honeycomb structure.

Although the silicon carbide powders are not particularly limited, those which are less susceptible to shrinkage in the following firing process are desirable, and for example, a mixture of at least about 4.7% by weight and at most about 39.4% by weight of silicon carbide fine powder having an average particle diameter (D50) of at least about 0.1 μm and at most about 1.0 μm and at least about 60.6% by weight and at most about 95.3% by weight of silicon carbide coarse powder having an average particle diameter (D50) larger than that of the silicon carbide fine powder is more desirably used. In order to adjust the pore diameter and the like of the honeycomb structure, the firing temperature needs to be controlled; however, it may be possible for the pore diameter to be adjusted by controlling the particle diameter of the silicon carbide powder.

Moreover, the purity of the silicon carbide powder is desirably at least about 96.0% by weight and at most about 99.5% by weight. The reason for this is that the effect of adding the additive to the material composition is more likely to be particularly beneficial in the case where silicon carbide powder with high purity as mentioned above is used, and the pore diameter of the manufactured honeycomb structure tends not to vary widely when the purity of the silicon carbide is about 96.0% by weight or more. Although it may be possible for silicon carbide having such high purity as the purity exceeding about 99.5% by weight to have the above-mentioned benefit deriving from addition of the additive, the high-purity silicon carbide with the purity exceeding about 99.5% by weight is high in cost; thus, using silicon carbide powder of this type is economically disadvantageous, and in addition, there is not so much difference in the characteristics as a honeycomb structure, such as the strength and durability of the honeycomb structure, thereby the upper limit value of the purity of the silicon carbide powder is desirably about 99.5% by weight.

In the present specification, the purity of the silicon carbide powder refers to the amount (weight-percent) of silicon carbide contained in the silicon carbide powder. In general, even if there is a powder called a silicon carbide powder, such a powder happens to contain some impurities that are unavoidably mixed and exist in the powder (unavoidable impurities) during the steps for manufacturing and storing the silicon carbide powder.

The silicon carbide powder may be an α-type silicon carbide powder, a β-type silicon carbide powder or a mixture of the α-type silicon carbide powder and β-type silicon carbide powder; however α-type silicon carbide powder is desirably used. The α-type silicon carbide powder is less expensive than the β-type silicon carbide powder, and the pore diameter can be more easily regulated when the α-type silicon carbide powder is used, and therefore the α-type silicon carbide powder is more suitable for manufacturing a silicon carbide sintered body having a uniform pore diameter.

Examples of the binder include methyl cellulose, carboxymethyl cellulose, hydroxyethyl cellulose, polyethyleneglycol and the like. The compounding amount of the binder is desirably set to at least about 1 part by weight and at most about 10 parts by weight to 100 parts by weight of silicon carbide powder.

Further, a plasticizer, a lubricant and the like may be included in the material composition. The plasticizer is not particularly limited, and examples thereof include glycerin and the like. Also, the lubricant is not particularly limited, and the examples thereof include polyoxyalkylene-based compounds such as polyoxyethylene alkyl ether, polyoxypropylene alkyl ether and the like. Specific examples of the lubricant include polyoxyethylene monobutyl ether, polyoxypropylene monobutyl ether and the like.

As a specific process for preparing the material composition, for example, a process in which firstly two kinds of silicon carbide powders having different average particle diameters (D50) and a binder are dry-mixed to prepare a mixed powder, while separately a plasticizer, a lubricant, water and the like are mixed to prepare a mixed solution, and then the mixed powder and the mixed solution are mixed using a wet-type mixer, and the like may be used.

In the material composition, a pore-forming agent may be added if necessary. Examples of the pore-forming agent include balloons that are fine hollow spheres composed of oxide-based ceramics, spherical acrylic particles, graphite and the like. The material composition produced in this process is desirably at a temperature of about 28° C. or less. If the temperature is too high, the binder tends to gel. Moreover, the water content of the material composition is desirably set to at least about 8% by weight and at most about 20% by weight.

Next, the material composition is extrusion-molded by an extrusion-molding method and the like. The molded body obtained by the extrusion molding is cut by a cutting machine to manufacture a honeycomb molded body which has the same shape as the pillar-shaped honeycomb fired body 110 shown in FIG. 2A, but not sealed on the end portion.

After that, if necessary, either one of the end portions of each cells is filled with a predetermined amount of plug material paste that is to form a plug so that the cells are sealed. Specifically, in the case of manufacturing the honeycomb structure functioning as a ceramic filter, either one of end portions of each cells is sealed. Here, if necessary, a drying treatment may be carried out on the honeycomb molded body before the cells of the honeycomb molded body is sealed, and in such a case the drying process may be carried out by using a microwave drying apparatus, a hot-air drying apparatus, a reduced-pressure drying apparatus, a dielectric drying apparatus, a frozen drying apparatus and the like.

With respect to the plug material paste, although not particularly limited, such paste as to set the porosity of a plug produced through the succeeding processes to at least about 30% and at most about 75% is desirably used, and for example, the same paste as the above-mentioned material composition may be used.

Filling of the plug material paste into the cells may be carried out according to need. By filling the plug material paste into the cells, the honeycomb structure obtained through the succeeding steps can be preferably used, for example, as a ceramic filter, while by not filling the plug material paste into the cells, the honeycomb structure obtained through the succeeding steps can be preferably used, for example, as a catalyst supporting carrier.

Next, according to need, a degreasing treatment is carried out on the honeycomb molded body in which the plug material paste has been filled under a predetermined condition (for example, at a temperature of at least about 200° C. and at most about 500° C. for at least about 2 hours and at most about 4 hours). The condition for the degreasing is set at a condition that allows carbons to remain in the honeycomb degreased body.

Next, a firing treatment is carried out on the honeycomb molded body which has been degreased is subjected to under a predetermined condition (for example, at a temperature of at least about 1400° C. and at most about 2300° C.) to manufacture a pillar-shaped honeycomb fired body in which a plurality of cells are placed in parallel in the longitudinal direction with a cell wall therebetween and either of end portions of each of the cell is sealed. As already explained, in the manufacturing method according to the embodiments of the present invention, carbons in the degreased body are more likely to be removed by the additive during this firing process, and thus sintering of silicon carbide tends to proceed without fail.

Next, a sealing material paste to form a sealing material layer (adhesive layer) is applied to each of the side faces of the honeycomb fired body with even thickness, and by repeating a process of successively piling up another honeycomb fired body on this sealing material paste layer, an aggregated body of honeycomb fired bodies having a predetermined size is manufactured.

As examples of the sealing material paste, a material including inorganic fibers and/or inorganic particles in addition to an inorganic binder and an organic binder, and the like may be mentioned.

Examples of the inorganic binder include silica sol, alumina sol and the like. Each of these materials may be used alone, or two or more kinds of these may be used in combination. Among the above-mentioned inorganic binders, silica sol is more desirably used.

Examples of the organic binder include polyvinyl alcohol, methylcellulose, ethyl cellulose, carboxymethyl cellulose and the like. Each of these may be used alone or two or more kinds of these may be used in combination. Among the organic binders, carboxymethyl cellulose is more desirably used.

Examples of the inorganic fibers include ceramic fiber such as silica-alumina, mullite, alumina, silica and the like. Each of these may be used alone, or two or more kinds of these may be used in combination. Among the inorganic fibers, alumina fibers are more desirably used.

Examples of the inorganic particles include carbides, nitrides and the like, more specifically, inorganic powder made of silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres composed of oxide-based ceramics and a pore-forming agent such as spherical acrylic particles and graphite may be added to the sealing material paste, if necessary. The balloons are not particularly limited, and the examples thereof include alumina balloons, glass micro-balloons, shirasu balloons, fly ash balloons (FA balloons), mullite balloons and the like. Among these, alumina balloons are more desirably used.

Next, the aggregated body of the honeycomb fired bodies is heated so that the sealing material paste is dried and solidified to form a sealing material layer (adhesive layer). Moreover, the aggregated body of the honeycomb fired bodies in which a plurality of the honeycomb fired bodies are bonded to one another by interposing the sealing material layer (adhesive layer) is subjected to a cutting process by using a diamond cutter and the like so that a honeycomb block having a cylindrical shape is manufactured.

By forming a sealing material layer (coat layer) on the outer periphery of the honeycomb block by using the sealing material paste, a honeycomb structure, in which the sealing material layer (coat layer) is formed on the peripheral portion of the cylindrical honeycomb block having a plurality of the honeycomb fired bodies bonded to one another with the sealing material layer (adhesive layer) interposed therebetween, can be manufactured. The shape of the honeycomb structure manufactured by the manufacturing method of the present invention is not limited to a cylindrical shape, and may be any pillar-shaped body including a rectangular pillar shape, a cylindroid shape and the like.

Thereafter, a catalyst is supported on the honeycomb structure, if necessary. The catalyst may be supported on the honeycomb fired bodies prior to being manufactured into the aggregated body. Upon supporting the catalyst thereon, desirably, an alumina film having a high specific surface area is formed on the surface of the honeycomb structure, and a co-catalyst and a catalyst such as platinum are applied to the surface of this alumina film.

Examples of the method for forming the alumina film on the surface of the honeycomb structure include a method in which the honeycomb structure is impregnated with a solution of a metal compound containing aluminum such as $Al(NO_3)_3$ and then heated, and a method in which the honeycomb structure is impregnated with a solution containing alumina powder and then heated, and the like. With respect to the method for applying a co-catalyst to the alumina film, for example, a method in which the honeycomb structure is impregnated with a solution of a metal compound containing a rare-earth element, such as $Ce(NO_3)_3$, and then heated is proposed. Examples of the method for applying a catalyst to the alumina film include a method in which the honeycomb structure is impregnated with a nitric acid solution of diamine dinitro platinum ($[Pt(NH_3)_2(NO_2)_2]HNO_3$: about 4.53% by weight in platinum concentration) or the like and then heated, and the like. Moreover, the catalyst may be applied in such a manner that a catalyst is preliminarily applied to alumina particles and the honeycomb structure is impregnated with a solution containing the alumina powder to which the catalyst has been applied, and then heated.

In the above, as the method for manufacturing a honeycomb structure according to the embodiments of the present invention, explanations have been made on the method for manufacturing a honeycomb structure in which a plurality of honeycomb fired bodies are bonded to one another by interposing sealing material layers (adhesive layers) (hereinafter, also referred to as an aggregated honeycomb structure), as shown in FIGS. 1, 2A and 2B; however, the honeycomb structure to be formed by the manufacturing method of the present invention may be a honeycomb structure in which a cylindrical-shaped ceramic block is formed by a single piece of the honeycomb fired body (hereinafter, also referred to as an integral honeycomb structure).

For manufacturing the integral honeycomb structure, first, a honeycomb molded body is manufactured by using the same method as that used for manufacturing the aggregated honeycomb structure, except that the size of the honeycomb molded body to be formed through extrusion-molding is larger in comparison with that of the aggregated honeycomb structure.

Next, in the same manner as in the aggregated honeycomb structure, drying treatment or filling of the plug material paste into the cells is carried out, if necessary. After this, the honeycomb molded body is subjected to a degreasing treatment under the same condition as in the manufacturing method of the aggregated honeycomb structure to manufacture a honeycomb degreased body. Further, the honeycomb degreased body is subjected to a firing treatment to manufacture a honeycomb block formed by a honeycomb fired body, and by forming a sealing material layer (coat layer) according to need, an integral honeycomb structure can be manufactured. Here, a catalyst may be supported on the integral honeycomb structure by the above-mentioned method.

According to the method for manufacturing a honeycomb structure according to the embodiments of the present invention as described the above, it may become easier to manufacture a honeycomb structure having small dispersion in the pore diameter and high strength. The description in the above mainly discuss the method for manufacturing a honeycomb structure according to the embodiments of the present invention, by taking a honeycomb structure which can be suitably used as a ceramic filter as an example. However, in the method for manufacturing a honeycomb structure according to the embodiments of the present invention, the honeycomb structure may be manufactured without being filled with a plug material paste as mentioned above, and the honeycomb structure in which the end portion of the cells is not sealed with the plug can be suitably used as a catalyst supporting carrier.

Moreover, in the method for manufacturing a honeycomb structure according to the embodiments of the present invention described above, the material composition prepared in the first step is the material composition for a honeycomb fired body according to the embodiments of the present invention; thus the description is omitted.

EXAMPLES

Example 1

A mixed powder was prepared by mixing 250 kg of α-type silicon carbide powder (purity: 98% by weight) having an average particle diameter of 10 μm, 100 kg of α-type silicon carbide powder (purity: 97% by weight) having an average particle diameter of 0.5 μm, 14.0 kg of amorphous silica powder (CARPLEX #67 made by Degussa Corporation) having an average particle diameter of 0.2 μm and 20 kg of an organic binder (methyl cellulose). Here, the total amount of silica contained in the silicon carbide powder was 7 kg. In all Examples and Comparative Examples including the present example, average particle diameters were measured by a laser diffraction scattering method. Next, 12 kg of lubricant (UNILUB manufactured by NOF Corp.), 5 kg of plasticizer (glycerin) and 65 kg of water were separately mixed to prepare a liquid mixture, and then this liquid mixture was mixed with the mixed powder using a wet-type mixer to prepare a material composition. Here, the compounding amount of the silica powder was 3% by weight of the total amount of the silicon carbide powder, and the sum total of the amount of the silica in the material composition was 17.8 kg (3.8% by weight).

Next, the material composition was transferred to an extrusion-molding machine by using a conveyer, and was charged into the material supplying part of the extrusion-molding machine. Then, by extrusion molding, a molded body having the same shape as the shape shown in FIGS. 2A and 2B, except that the end portions of cells were not sealed, was manufactured.

Next, the honeycomb molded body was dried by using a dryer that applies microwave and hot-air in combination, and then the predetermined cells were filled with the sealing material paste having the same composition as the material composition. Further, after again dried using a drying apparatus, the honeycomb molded body which had been filled with the sealing material paste was degreased at the conditions of the degreasing temperature of 350° C., $O_2$ concentration of 9% in the atmosphere, and degreasing time of 3 hours to manufacture a honeycomb degreased body.

After that, by subjecting the resulting product to firing at 2200° C. in a normal-pressure argon atmosphere for 3 hours, a honeycomb fired body formed by a silicon carbide sintered body with a porosity of 40%, having a size of 34.3 mm×34.3 mm×150 mm, the number of cells (cell density) of 46.5 pcs/cm² and a thickness of the cell walls of 0.25 mm was manufactured.

Next, by using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of the honeycomb fired bodies were bonded to one another, and this was dried at 120° C. and then cut by using a diamond cutter so that a cylindrical honeycomb block having a thickness of the sealing material layer (adhesive layer) of 1 mm was manufactured.

Next, silica-alumina fibers (average fiber length: 100 μm, average fiber diameter: 10 μm) (23.3% by weight), which served as inorganic fibers, silicon carbide powder having an average particle diameter of 0.3 μm (30.2% by weight), which served as inorganic particles, silica sol (content ratio of silica in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

By using the above-mentioned sealing material paste, a sealing material paste layer having a thickness of 0.2 mm was formed on the peripheral portion of the honeycomb block. Further, this sealing material paste layer was dried at 120° C. so that a cylindrical honeycomb structure with a sealing material layer (coat layer) being formed on the periphery having a size of 143.8 mm in diameter×150 mm in length was manufactured.

Examples 2 to 7

Reference Examples 1 to 4

A honeycomb structure was manufactured through the same processes as in Example 1, except that the average particle diameter or the added amount of silica powder were changed to the values as shown in Tables 1 and 2.

Examples 8 to 15

Reference Examples 5 to 7

A honeycomb structure was manufactured through the same processes as in Example 1, except that the silicon carbide powders having the purity as shown in Tables 1 and 2 were respectively used as the α-type silicon carbide powder having an average particle diameter of 10 μm and the α-type silicon carbide powder having an average particle diameter of 0.5 μm.

Comparative Example 1

A honeycomb structure was manufactured through the same processes as in Example 1, except that the silica powder was not mixed into the material composition.

Comparative Examples 2 to 4

A honeycomb structure was manufactured through the same processes as in Comparative example 1, except that the silicon carbide powders having the purity as shown in Table 2 were respectively used as the α-type silicon carbide powder having an average particle diameter of 10 μm and the α-type silicon carbide powder having an average particle diameter of 0.5 μm.

TABLE 1

| | Compounding amount in material composition (kg) | | | | | | | | | | | Total SiO$_2$ in material composition | |
|---|---|---|---|---|---|---|---|---|---|---|---|---|---|
| | α-type silicon carbide powder | | | | SiO$_2$ powder | | | | Binder | Plasticizer | | | |
| | Average particle diameter/10 μm | | Average particle diameter/0.5 μm | | SiO$_2$ | Compounding amount (kg) | Content (% by weight) | Average particle diameter (μm) | Methyl cellulose (kg) | Lubricant UNILUB (kg) | Glycerin (kg) | Water | Content (kg) | Content ratio (% by weight) |
| | Powder amount (kg) | Purity (% by weight) | Powder amount (kg) | purity (% by weight) | content (kg) | | | | | | | | | |
| Example 1 | 250 | 98 | 100 | 97 | 7 | 10.8 | 3 | 0.2 | 20 | 12 | 5 | 65 | 17.8 | 3.8 |
| Example 2 | 250 | 98 | 100 | 97 | 7 | 3.5 | 1 | 0.2 | 20 | 12 | 5 | 65 | 11.6 | 2.5 |
| Example 3 | 250 | 98 | 100 | 97 | 7 | 7.1 | 2 | 0.2 | 20 | 12 | 5 | 65 | 16.2 | 3.5 |
| Example 4 | 250 | 98 | 100 | 97 | 7 | 14.6 | 4 | 0.2 | 20 | 12 | 5 | 65 | 25.8 | 5.5 |
| Example 5 | 250 | 98 | 100 | 97 | 7 | 18.4 | 5 | 0.2 | 20 | 12 | 5 | 65 | 30.8 | 6.5 |
| Example 6 | 250 | 98 | 100 | 97 | 7 | 10.8 | 3 | 0.05 | 20 | 12 | 5 | 65 | 17.8 | 3.8 |
| Example 7 | 250 | 98 | 100 | 97 | 7 | 10.8 | 3 | 0.3 | 20 | 12 | 5 | 65 | 17.8 | 3.8 |
| Example 8 | 250 | 98 | 100 | 99.5 | 5 | 10.8 | 3 | 0.2 | 20 | 12 | 5 | 65 | 15.8 | 3.4 |
| Example 9 | 250 | 98 | 100 | 98 | 6 | 10.8 | 3 | 0.2 | 20 | 12 | 5 | 65 | 16.8 | 3.6 |
| Example 10 | 250 | 98 | 100 | 96 | 8 | 10.8 | 3 | 0.2 | 20 | 12 | 5 | 65 | 18.8 | 4.0 |
| Example 11 | 250 | 99.5 | 100 | 97 | 3.25 | 10.8 | 3 | 0.2 | 20 | 12 | 5 | 65 | 14.05 | 3.0 |
| Example 12 | 250 | 97 | 100 | 97 | 4.5 | 10.8 | 3 | 0.2 | 20 | 12 | 5 | 65 | 15.3 | 3.3 |
| Example 13 | 250 | 96 | 100 | 97 | 7 | 10.8 | 3 | 0.2 | 20 | 12 | 5 | 65 | 17.8 | 3.8 |
| Example 14 | 250 | 99 | 100 | 99 | 3 | 10.8 | 3 | 0.2 | 20 | 12 | 5 | 65 | 13.8 | 3.0 |
| Example 15 | 250 | 96 | 100 | 96 | 7 | 10.8 | 3 | 0.2 | 20 | 12 | 5 | 65 | 17.8 | 3.8 |

TABLE 2

| | Compounding amount in material composition (kg) | | | | | | | | | | | | Total SiO₂ in material composition | |
|---|---|---|---|---|---|---|---|---|---|---|---|---|---|---|
| | α-type silicon carbide powder | | | | | | | | Binder | Plasticizer | | | | |
| | Average particle diameter/10 μm | | Average particle diameter/0.5 μm | | SiO₂ | SiO₂ powder | | | Methyl cellulose | Lubricant UNILUB | Glycerin | Water | | Content |
| | Powder amount (kg) | Purity (% by weight) | Powder amount (kg) | Purity (% by weight) | content (kg) | Compounding amount (kg) | Content (% by weight) | Average particle diameter (μm) | (kg) | (kg) | (kg) | (kg) | Content (kg) | ratio (% by weight) |
| Reference Example 1 | 250 | 98 | 100 | 97 | 7 | 1.76 | 0.5 | 0.2 | 20 | 12 | 5 | 65 | 9.3 | 2.0 |
| Reference Example 2 | 250 | 98 | 100 | 97 | 7 | 22.3 | 6 | 0.2 | 20 | 12 | 5 | 65 | 35.9 | 7.5 |
| Reference Example 3 | 250 | 98 | 100 | 97 | 7 | 10.8 | 3 | 0.01 | 20 | 12 | 5 | 65 | 17.8 | 3.8 |
| Reference Example 4 | 250 | 98 | 100 | 97 | 7 | 10.8 | 3 | 0.4 | 20 | 12 | 5 | 65 | 17.8 | 3.8 |
| Reference Example 5 | 250 | 98 | 100 | 95 | 9 | 10.8 | 3 | 0.2 | 20 | 12 | 5 | 65 | 19.8 | 4.2 |
| Reference Example 6 | 250 | 95 | 100 | 97 | 12 | 10.8 | 3 | 0.2 | 20 | 12 | 5 | 65 | 22.8 | 4.9 |
| Reference Example 7 | 250 | 95 | 100 | 95 | 14 | 10.8 | 3 | 0.2 | 20 | 12 | 5 | 65 | 24.8 | 5.4 |
| Comparative Example 1 | 250 | 98 | 100 | 97 | 7 | — | — | — | 20 | 12 | 5 | 65 | 7 | 1.5 |
| Comparative Example 2 | 250 | 95 | 100 | 97 | 12 | — | — | — | 20 | 12 | 5 | 65 | 12 | 2.7 |
| Comparative Example 3 | 250 | 98 | 100 | 98 | 6 | — | — | — | 20 | 12 | 5 | 65 | 6 | 1.3 |
| Comparative Example 4 | 250 | 98 | 100 | 95 | 9 | — | — | — | 20 | 12 | 5 | 65 | 9 | 2.0 |

In the examples, reference examples and comparative examples, after manufacturing honeycomb fired bodies, a three-point bending test was carried out on ten pieces of honeycomb fired bodies according to the following method. The results were as shown in Tables 3 and 4. In other words, with reference to JIS R 1601, a three-point bending test was carried out under conditions of a span of 135 mm and at a speed of 1 mm/min by using an Instron 5582, so that the bending strength (MPa) of each of the honeycomb fired bodies was measured.

Also, in the examples, reference examples and comparative examples, after manufacturing honeycomb fired bodies, pore diameters of the pores formed in the honeycomb fired bodies were measured according to the following method. The results were as shown in Tables 3 and 4. In other words, in compliance with JIS R 1665, a fine-pore distribution measuring apparatus (AutoPore III 9405, manufactured by Shimadzu Corp.) to be used in a mercury injection method was used to measure the fine pore distribution in samples prepared by cutting out a 1 cm cube each from ten pieces of honeycomb fired bodies with respect to each of the center parts of the honeycomb fired bodies. Here, the fine-pore distribution was measured on fine-pores with a fine-pore diameter in the range of 0.2 μm to 500 μm. The average fine-pore diameter here was calculated based on (4V/A), and thereby the average fine-pore diameter (average pore diameter) and the standard deviation were calculated.

The contents of JIS R 1601 and JIS R 1655 are incorporated herein by reference in their entirety.

The pressure loss was measured on the honeycomb structures manufactured in the examples, reference examples and comparative examples. The results were shown in Tables 3 and 4. Here, the number of sample was 10 pcs. With respect to the pressure loss of the honeycomb structures, the initial pressure loss was measured at a flow rate of 1000 N·m³/h.

TABLE 3

| | Pore diameter | | Bending strength (MPa) | Pressure loss of honeycomb structure (kPa) |
|---|---|---|---|---|
| | Average value (μm) | Standard deviation (μm) | | |
| Example 1 | 11.2 | 0.35 | 30.0 | 8.98 |
| Example 2 | 10.1 | 0.41 | 31.1 | 9.34 |
| Example 3 | 10.7 | 0.39 | 32.5 | 9.10 |
| Example 4 | 11.4 | 0.30 | 30.5 | 8.98 |
| Example 5 | 11.5 | 0.30 | 30.1 | 8.98 |
| Example 6 | 11.6 | 0.27 | 31.3 | 8.90 |
| Example 7 | 9.5 | 0.48 | 29.0 | 9.41 |
| Example 8 | 10.4 | 0.41 | 32.2 | 9.26 |
| Example 9 | 11.0 | 0.33 | 30.8 | 9.02 |
| Example 10 | 11.4 | 0.30 | 31.1 | 8.98 |
| Example 11 | 11.2 | 0.33 | 30.1 | 9.06 |
| Example 12 | 10.6 | 0.39 | 31.0 | 9.06 |
| Example 13 | 10.1 | 0.43 | 32.2 | 9.06 |
| Example 14 | 11.5 | 0.28 | 31.8 | 9.02 |
| Example 15 | 9.7 | 0.46 | 30.0 | 9.45 |

TABLE 4

| | Pore diameter | | Bending strength (MPa) | Pressure loss of honeycomb structure (kPa) |
|---|---|---|---|---|
| | Average value (μm) | Standard deviation (μm) | | |
| Reference Example 1 | 7.6 | 0.68 | 22.0 | 9.81 |
| Reference Example 2 | 12.5 | 0.21 | 23.5 | 8.82 |
| Reference Example 3 | 12.7 | 0.19 | 23.0 | 8.86 |
| Reference Example 4 | 7.4 | 0.70 | 22.1 | 9.85 |

TABLE 4-continued

|  | Pore diameter | | Bending strength (MPa) | Pressure loss of honeycomb structure (kPa) |
|---|---|---|---|---|
|  | Average value (μm) | Standard deviation (μm) |  |  |
| Reference Example 5 | 8.7 | 0.58 | 25.4 | 9.77 |
| Reference Example 6 | 8.2 | 0.62 | 26.0 | 10.05 |
| Reference Example 7 | 7.5 | 0.69 | 25.5 | 10.09 |
| Comparative Example 1 | 6.2 | 0.82 | 20.2 | 10.56 |
| Comparative Example 2 | 7.3 | 0.77 | 21.4 | 10.14 |
| Comparative Example 3 | 6.9 | 0.75 | 21.5 | 10.32 |
| Comparative Example 4 | 6.5 | 0.78 | 20.3 | 10.40 |

As shown in Tables 3 and 4, it is revealed that, in the method for manufacturing a honeycomb structure of the present invention, by adding the predetermined additive to the material composition, a honeycomb structure in which the dispersion of the pore diameter is small, the strength is high, and the pressure loss is low may be manufactured more easily (see the examples, reference examples and comparative examples). When a honeycomb structure is manufactured without compounding the additive, the honeycomb structure has a highly dispersed pore diameter, low bending strength, and further tends to become high in pressure loss.

Figure 3:
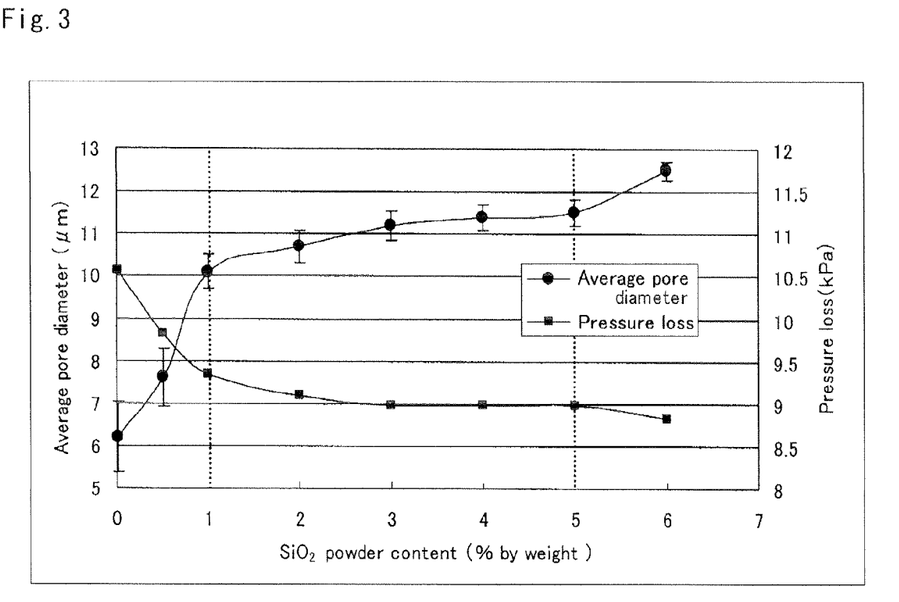
FIG. 3 is a graph that shows a relationship between the content of silica powder in the material composition and either of the average pore diameter and the pressure loss of the honeycomb structures in the Examples 1 to 5, Reference Examples 1 and 2 and Comparative Example 1.
Figure 4:
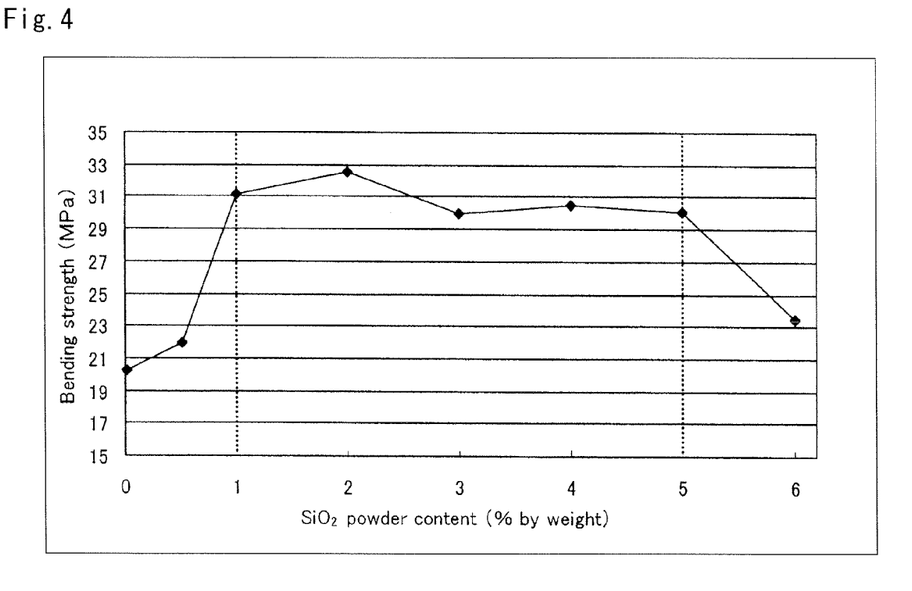
FIG. 4 is a graph that shows a relationship between the content of silica powder in the material composition and the bending strength of the honeycomb fired bodies in the Examples 1 to 5, Reference Examples 1 and 2, and Comparative Example 1.

According to the results of the Examples 1 to 5, Reference Examples 1 and 2, and Comparative Example 1, it is revealed that the desirable compounding amount of the additive is at least about 1% by weight and at most about 5% by weight (see FIGS. 3 and 4).

FIG. 3 is a graph that shows the relationship between the content of silica powder in the material composition and either of the average pore diameter and the pressure loss of the honeycomb structures in the Examples 1 to 5, Reference Examples 1 and 2, and Comparative Example 1. FIG. 4 is a graph that shows a relationship between the content of silica powder in the material composition and the bending strength of the honeycomb fired bodies in the Examples 1 to 5, Reference Examples 1 and 2, and Comparative Example 1.

As shown in FIGS. 3 and 4, it is revealed that, by setting the compounding amount of the additive to about 1% by weight to about 5% by weight, a honeycomb fired body having excellent bending strength as exceeding 30 Mpa may be manufactured more easily. Also, when the compounding amount of the additive was set to about 1% to about 5% by weight, dispersion of the pore diameter tends to be made smaller as compared to the case where the compounding amount of the additives is less than about 1% by weight.

The results of Examples 1 to 5 and Reference Examples 1 and 2 also reveal that the desirable content of silica in the material composition is at least about 2.5% by weight and at most about 6.5% by weight.

Figure 5:
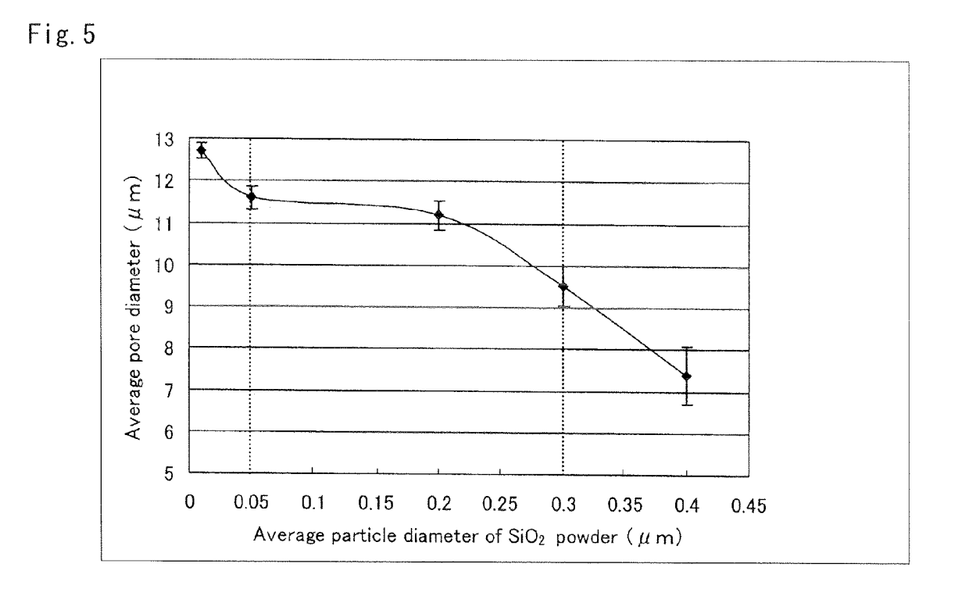
FIG. 5 is a graph that shows a relationship between the average particle diameter of the silica powder in the material composition and the average pore diameter of the honeycomb structures in the Examples 1, 6 and 7, and Reference Examples 3 and 4.
Figure 6:
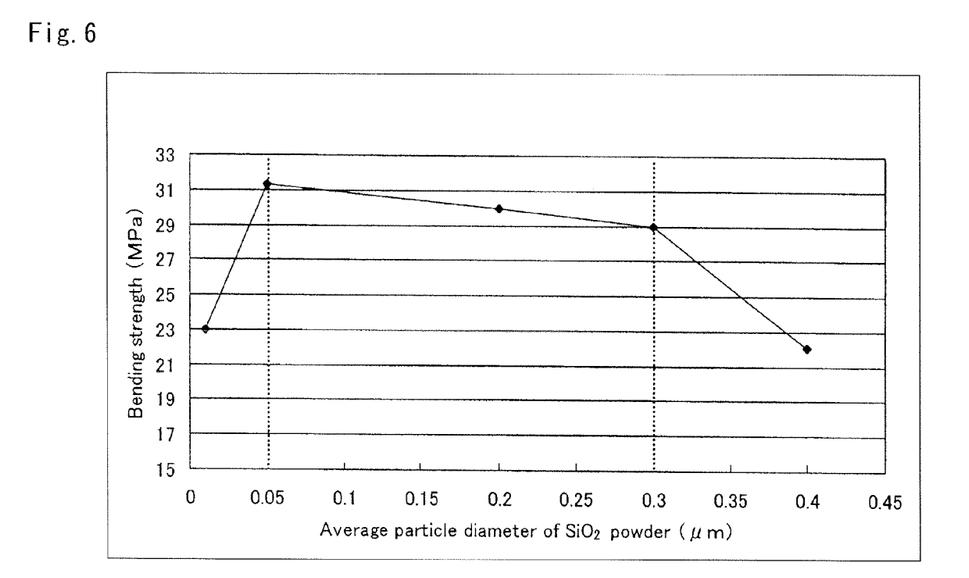
FIG. 6 is a graph that shows a relationship between the average particle diameter of silica powder in the material composition and the bending strength of the honeycomb fired bodies in the Examples 1, 6 and 7 and Reference Examples 3 and 4.

According to the results of the Examples 1, 6 and 7, and Reference Examples 3 and 4, it is revealed that the average particle diameter (D50) of the additive is desirably set to at least about 0.05 μm and at most about 0.3 μm (see FIGS. 5 and 6).

FIG. 5 is a graph that shows a relationship between the average particle diameter of the silica powder in the material composition and the average pore diameter of the honeycomb structures in the Examples 1, 6 and 7 and Reference Examples 3 and 4, and FIG. 6 is a graph that shows a relationship between the average particle diameter of the silica powder in the material composition and the bending strength of the honeycomb fired bodies in the Examples 1, 6 and 7 and Reference Examples 3 and 4.

As shown in FIGS. 5 and 6, it was revealed that, by setting the average particle diameter (D50) of the additive to about 0.05 μm to about 0.3 μm, a honeycomb fired body having, in particular, an excellent bending strength may be manufactured more easily. Also, when the average particle diameter (D50) of the additive is set to about 0.05 μm to about 0.3 μm, dispersion in the pore diameter tends to be reduced as compared with the case where the compounding amount of the additive exceeds about 0.3 μm.

The purity of the silicon carbide powder was revealed to be desirably at least about 96.0% and at most about 99.5% by weight (Examples 1 and 8 to 15 and Reference Examples 5 to 7). By setting the purity of the silicon carbide powders to the above-mentioned range, a honeycomb structure in which the dispersion of the pore diameter is small, the bending strength is high, and the pressure loss is low may be manufactured more easily. On the other hand, when the purity of the silicon carbide powder is less than about 96.0% by weight, the dispersion of the pore diameter tends to be high and the pressure loss also tends to become high.

As shown in the results of the Reference Examples 1 to 4, it is revealed that, when the additive was not added to the material composition, the obtained honeycomb structure tends to have low strength and high pressure loss, regardless of the purity of the silicon carbide powder.

The results in the examples, reference examples, and comparative examples further show that the material composition for a honeycomb fired body of the present invention can be suitably used for manufacturing a honeycomb fired body.

In the above examples, the cases where silica was used as an additive have been exemplified, however, since alumina, titania, zirconia, magnesia, and a chemical composite containing any of alumina, silica, titania, zirconia and magnesia are additives having the same characteristics, it may be considered that those additives have the same effects in manufacturing the honeycomb structure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure comprising a honeycomb fired body, comprising:
    preparing a material composition containing at least a silicon carbide powder, a binder and an additive;
    manufacturing a pillar-shaped honeycomb molded body in which a number of cells are placed in parallel with one another in a longitudinal direction with a cell wall therebetween by molding said material composition;
    manufacturing a honeycomb degreased body by carrying out a degreasing treatment on said honeycomb molded body wherein an amount of carbon remains in the honeycomb degreased body; and
    manufacturing a honeycomb fired body by carrying out a firing treatment on said honeycomb degreased body wherein the amount of carbon is removed from the honeycomb degreased body so that silicon carbide particles of the silicon carbide powder are combined with one another, wherein said additive is a powder having an average particle diameter (D50) of at least about 0.05 μm and at most about 0.3 μm,
wherein said additive is silica,
wherein a purity of said silicon carbide powder is at least about 96.0% by weight and at most about 99.5% by weight, and
wherein the compounding amount of said additive is at least about 1% by weight and at most about 5% by weight of the total amount of said silicon carbide powder.

2. The method for manufacturing a honeycomb structure according to claim 1, wherein the content of silica in said material composition is at least about 2.5% by weight and at most about 6.5% by weight.

3. The method for manufacturing a honeycomb structure according to claim 1, wherein said silica is an amorphous silica.

4. The method for manufacturing a honeycomb structure according to claim 1, wherein the average particle diameter (D50) of said additive is smaller than that of said silicon carbide.

5. The method for manufacturing a honeycomb structure according to claim 1, wherein said silicon carbide powder comprises:

a silicon carbide fine powder having the average particle diameter (D50) of at least about 0.1 μm and at most about 1.0 μm; and
a silicon carbide coarse powder having the average particle diameter (D50) larger than that of said silicon carbide fine powder, and
the content of said silicon carbide fine powder with respect to the total amount of said silicon carbide powder is at least about 4.7% by weight and at most about 39.4% by weight.

6. The method for manufacturing a honeycomb structure according to claim 5, wherein the average particle diameter (D50) of said additive is smaller than that of said silicon carbide fine powder.

7. The method for manufacturing a honeycomb structure according to claim 1, wherein said honeycomb structure is manufactured by bonding a plurality of said honeycomb fired bodies to one another by interposing adhesive layers.

8. The method for manufacturing a honeycomb structure according to claim 1, wherein said honeycomb structure is manufactured by a single piece of said honeycomb fired body.

9. The method for manufacturing a honeycomb structure according to claim 1, wherein either one of end portions of each cell of said honeycomb fired body is sealed with a plug.

* * * * *